(No Model.)
P. T. COFFIELD.
VALVE CASING AND SEAT.
No. 438,572. Patented Oct. 14, 1890.
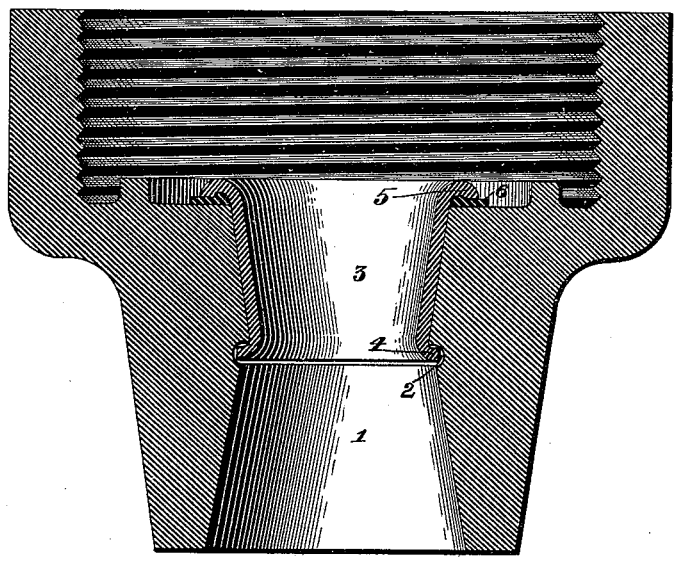
WITNESSES:
F. L. Durand.
Jo. L. Coombs
INVENTOR:
Peter T. Coffield
J. Ennis Dugger & Co.
Attorneys.

UNITED STATES PATENT OFFICE.

PETER T. COFFIELD, OF NEW CARLISLE OHIO, ASSIGNOR OF ONE-HALF TO JOHN V. PERRINE, OF SAME PLACE.

VALVE CASING AND SEAT.

SPECIFICATION forming part of Letters Patent No. 438,572, dated October 14, 1890.

Application filed February 13, 1890. Serial No. 340,313. (No model.)

*To all whom it may concern:*

Be it known that I, PETER T. COFFIELD, a citizen of the United States, and a resident of New Carlisle, in the county of Clark and State of Ohio, have invented certain new and and useful Improvements in Valve Casings and Seats; and I do hereby declare that the following is a full, clear, and exact description of the invention, which will enable others skilled in the art to which it appertains to make and use the same.

My invention relates to improvements in the construction of valve casings and seats for circular valves, whereby the usual soft-metal lining constituting the valve-seat is securely retained in position within the casing and a perfectly air-tight joint formed between said casing and lining.

The invention consists in the combination, with a valve-casing provided with an interior annular groove, of a soft-metal lining constituting the valve-seat, turned outwardly at its lower edge, forming a flange which fits into said annular groove and having its upper edge turned down upon the surface of the casing, with an elastic washer interposed between the turned-down portion and the casing, as will be hereinafter more fully described.

In the accompanying drawing, the figure represents a central vertical sectional view of a valve casing and seat constructed according to my invention.

In the said drawing, the reference-numeral 1 designates a circular metallic valve-casing, which is intended to be used in connection with any description of valve found convenient or desirable. Near its upper portion this valve-casing is provided with an interior annular groove 2 of any suitable form or configuration.

The numeral 3 indicates the lining constituting the valve-seat. It consists of a short sleeve or cylinder of soft metal, corresponding in shape and size with the interior of the casing and with the valve employed. This sleeve is forced into the interior of the casing in any desired manner, and its lower edge is turned outwardly at 4 and forced into the annular groove 2. The upper edge of the sleeve or lining is upset or turned down upon the surface of the casing forming a flange or rim 5, with an annular groove or recess therein to receive the elastic washer 6.

From the above description it will be seen that the lining is securely held in place within the casing by reason of its lower outwardly-projecting edge or rim 4 engaging with the annular groove 2, and by means of the elastic washer interposed between the upper flange or rim of the lining and the casing a perfectly air-tight joint is secured, whereby a very efficient article of the description before set forth is produced.

Having thus described my invention, what I claim is—

The combination, with a valve-casing having an interior annular groove at its upper portion, of a soft-metal lining constituting the valve-seat having its lower edge turned outwardly and fitting in the annular groove and its upper edge upset or turned down upon the casing, forming a flange or rim, and an elastic washer interposed between said flange and the casing, substantially as described.

In testimony that I claim the foregoing as my own I have hereunto affixed my signature in presence of two witnesses.

PETER T. COFFIELD.

Witnesses:
H. N. TAYLOR,
C. C. TAYLOR.